United States Patent
Elangovan et al.

(10) Patent No.: US 10,220,806 B2
(45) Date of Patent: Mar. 5, 2019

(54) MONITORING AND ALERTING VEHICLE OCCUPANTS FOR IGNITION SYSTEMS

(71) Applicant: Ford Global Technologies, LLC, Dearborn, MI (US)

(72) Inventors: Vivekanandh Elangovan, Canton, MI (US); John Robert Van Wiemeersch, Novi, MI (US); Erick Michael Lavoie, Dearborn, MI (US); Aaron Matthew DeLong, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/667,362

(22) Filed: Aug. 2, 2017

(65) Prior Publication Data

US 2019/0039546 A1    Feb. 7, 2019

(51) Int. Cl.
| | | |
|---|---|---|
| *B60R 21/015* | (2006.01) | |
| *G08B 21/24* | (2006.01) | |
| *G07C 9/00* | (2006.01) | |
| *G08B 21/22* | (2006.01) | |

(52) U.S. Cl.
CPC .... *B60R 21/01512* (2014.10); *G07C 9/00309* (2013.01); *G08B 21/22* (2013.01); *G08B 21/24* (2013.01); *E05Y 2400/852* (2013.01); *E05Y 2900/531* (2013.01)

(58) Field of Classification Search
None
See application file for complete search history.

(56) References Cited

U.S. PATENT DOCUMENTS

| | | | | | |
|---|---|---|---|---|---|
| 4,749,873 | A | * | 6/1988 | Mutoh | B60R 25/24 307/10.2 |
| 5,079,435 | A | * | 1/1992 | Tanaka | B60R 25/04 180/287 |
| 5,438,311 | A | * | 8/1995 | Lane, Sr. | B60R 25/10 180/287 |
| 5,659,291 | A | * | 8/1997 | Kennedy | B60Q 9/001 180/287 |
| 5,831,520 | A | * | 11/1998 | Stephan | B60R 25/225 340/457 |
| 6,246,313 | B1 | * | 6/2001 | Baker | B60K 31/0008 340/425.5 |
| 6,253,138 | B1 | * | 6/2001 | Shober | F16H 59/12 477/34 |
| 6,271,745 | B1 | * | 8/2001 | Anzai | G07C 9/00158 340/5.23 |
| 6,617,707 | B1 | * | 9/2003 | Reece | B60R 25/04 307/10.5 |

(Continued)

*Primary Examiner* — Curtis J King
(74) *Attorney, Agent, or Firm* — James P. Muraff; Neal, Gerber & Eisenberg LLP

(57) ABSTRACT

Method and apparatus are disclosed for monitoring and alerting vehicle occupants for ignition systems. An example vehicle includes a cabin, a touchscreen within the cabin, an engine to activate responsive to the touchscreen receiving a passcode, seats within the cabin, occupancy sensor modules to detect occupancy of the seats, and a warning controller. The warning controller is to initiate a timer upon detecting, via the occupancy sensor modules, that an occupant has exited the cabin and emit an alert responsive to the timer reaching a predetermined threshold.

20 Claims, 6 Drawing Sheets

(56) References Cited

U.S. PATENT DOCUMENTS

| | | | |
|---|---|---|---|
| 6,710,700 B1* | 3/2004 | Tatsukawa | B60R 25/04 340/5.52 |
| 6,927,668 B1* | 8/2005 | Odle | B60R 25/252 340/426.28 |
| 7,304,564 B2* | 12/2007 | Yang | B60R 25/24 307/10.5 |
| 7,457,695 B1* | 11/2008 | Fields | B60N 2/002 180/271 |
| 7,589,434 B1* | 9/2009 | Bronson | B60R 25/24 307/10.2 |
| 8,825,224 B2 | 9/2014 | Fazi | |
| 8,977,476 B2 | 3/2015 | Kirshon et al. | |
| 8,983,720 B2 | 3/2015 | Hosey et al. | |
| 9,002,569 B2 | 4/2015 | Tomik et al. | |
| 9,327,645 B2* | 5/2016 | Raman | G08B 21/24 |
| 2002/0048391 A1* | 4/2002 | Kim | B60R 25/04 382/124 |
| 2002/0050922 A1* | 5/2002 | Sashida | B60R 25/04 340/5.72 |
| 2002/0112688 A1* | 8/2002 | Fariz | B60K 28/10 123/179.2 |
| 2002/0196133 A1* | 12/2002 | Joynes | B60R 25/04 340/426.1 |
| 2003/0067384 A1* | 4/2003 | Funayose | F02B 61/045 340/438 |
| 2003/0097477 A1* | 5/2003 | Vossler | H04L 12/4612 709/248 |
| 2003/0137398 A1* | 7/2003 | Shibata | B60R 25/04 340/5.61 |
| 2003/0216817 A1* | 11/2003 | Pudney | E05B 81/78 700/17 |
| 2004/0059471 A1* | 3/2004 | Harvey | B60R 25/04 701/1 |
| 2004/0247363 A1* | 12/2004 | Kaufman | B60R 25/23 400/472 |
| 2005/0197744 A1* | 9/2005 | Kalau | B60R 25/04 701/1 |
| 2006/0132282 A1* | 6/2006 | McCall | B60R 1/12 340/5.2 |
| 2006/0213166 A1* | 9/2006 | Ameye | A01D 41/1274 56/10.1 |
| 2007/0046451 A1* | 3/2007 | Bihya | G08B 21/22 340/438 |
| 2007/0063823 A1* | 3/2007 | Fang | B60R 25/1004 340/426.1 |
| 2007/0250920 A1* | 10/2007 | Lindsay | G06F 21/31 726/7 |
| 2007/0255464 A1* | 11/2007 | Singh | B60R 25/102 701/36 |
| 2008/0218381 A1* | 9/2008 | Buckley | B60Q 1/50 340/932.2 |
| 2009/0237229 A1* | 9/2009 | Kautz | B60N 2/002 340/457 |
| 2009/0248219 A1* | 10/2009 | Kawauchi | B60R 25/241 701/1 |
| 2010/0094496 A1* | 4/2010 | Hershkovitz | B60L 3/12 701/22 |
| 2010/0121502 A1* | 5/2010 | Katayama | B60K 28/063 701/1 |
| 2010/0259359 A1* | 10/2010 | Ishikawa | B60R 16/033 340/5.2 |
| 2011/0061164 A1* | 3/2011 | Genaro | A61B 5/1115 5/424 |
| 2011/0068895 A1* | 3/2011 | Gee | B60R 25/00 340/5.67 |
| 2013/0141228 A1* | 6/2013 | Nagda | G08G 1/205 340/439 |
| 2013/0151072 A1* | 6/2013 | Jeong | B62D 1/046 701/36 |
| 2014/0025440 A1* | 1/2014 | Nagda | G06Q 10/08 705/7.38 |
| 2014/0084843 A1* | 3/2014 | Pham | B60L 11/1816 320/103 |
| 2014/0293053 A1* | 10/2014 | Chuang | A61B 5/6893 348/148 |
| 2015/0061856 A1* | 3/2015 | Raman | B60Q 9/00 340/457 |
| 2015/0088404 A1 | 3/2015 | Geissenhoener | |
| 2015/0102898 A1* | 4/2015 | Huennekens | G07C 9/00111 340/5.6 |
| 2015/0248799 A1* | 9/2015 | Lee | G07C 9/00174 340/5.53 |
| 2016/0098136 A1* | 4/2016 | Lobo | G06F 21/31 345/174 |
| 2016/0119782 A1* | 4/2016 | Kim | H04W 12/02 455/415 |
| 2016/0225203 A1 | 8/2016 | Asmar et al. | |
| 2016/0239715 A1* | 8/2016 | Nagai | G08B 21/06 |
| 2016/0300417 A1* | 10/2016 | Hatton | G07C 9/00857 |
| 2017/0018129 A1* | 1/2017 | Huebner | B60L 3/12 |
| 2017/0106783 A1* | 4/2017 | Fritz | B60Q 1/08 |
| 2017/0124987 A1* | 5/2017 | Kim | B60R 11/04 |
| 2017/0253245 A1* | 9/2017 | Khafagy | B60W 30/18054 |
| 2017/0263123 A1* | 9/2017 | Sachdev | H04W 4/046 |
| 2017/0297485 A1* | 10/2017 | Biesaga | B60Q 5/005 |

* cited by examiner

MONITORING AND ALERTING VEHICLE OCCUPANTS FOR IGNITION SYSTEMS

TECHNICAL FIELD

The present disclosure generally relates to vehicle ignition systems and, more specifically, to monitoring and alerting vehicle occupants for ignition systems.

BACKGROUND

Typically, keys are utilized to open doors of a vehicle and to activate an engine of the vehicle. Traditionally, mechanical keys have been utilized to open vehicle doors and to activate vehicle engines. For instance, a mechanical key is inserted into a keyhole and rotated to open a door and/or to activate an engine. Recently, key fobs and phone-as-a-keys have been utilized to open vehicle doors and to activate vehicle engines. For instance, a key fob and a phone-as-a-key wirelessly communicate with a vehicle to unlock a vehicle door and/or to activate an engine. More recently, some vehicles include a fob-less entry and ignition system that utilizes passcodes to enable a user to unlock a vehicle door and to activate an engine of the vehicle without a key (e.g., a mechanical key, a key fob, a phone-as-a-key) carried by the user of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for monitoring and alerting vehicle occupants for ignition systems. An example disclosed vehicle includes a cabin, a touchscreen within the cabin, an engine to activate responsive to the touchscreen receiving a passcode, seats within the cabin, occupancy sensor modules to detect occupancy of the seats, and a warning controller. The warning controller is to initiate a timer upon detecting, via the occupancy sensor modules, that an occupant has exited the cabin and emit an alert responsive to the timer reaching a predetermined threshold.

An example disclosed method includes receiving a passcode via an input device in a cabin of a vehicle and activating, via a processor, an engine responsive to the input device receiving the passcode. The example disclosed method also includes detecting occupancy of seats within the cabin via occupancy sensor modules. The example disclosed method also includes initiating, via the processor, a timer upon detecting, via the occupancy sensor modules, that an occupant has exited the cabin. The example disclosed method also includes emitting an alert responsive to the timer reaching a predetermined threshold.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
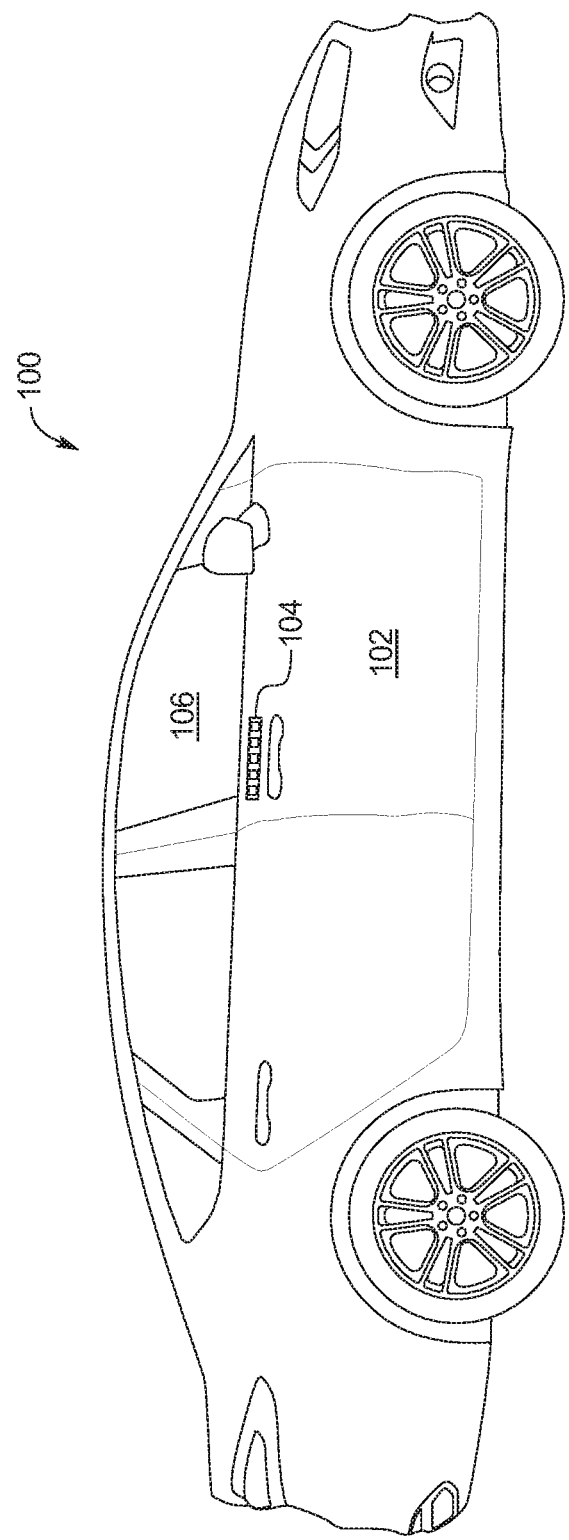
FIG. 1 depicts a side view of an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, keys are utilized to open doors of a vehicle and to activate an engine of the vehicle. Traditionally, mechanical keys have been utilized to open vehicle doors and to activate vehicle engines. For instance, a mechanical key is inserted into a keyhole and rotated to open a door and/or to activate an engine. Recently, key fobs and phone-as-a-keys have been utilized to open vehicle doors and to activate vehicle engines. For instance, a key fob and a phone-as-a-key wirelessly communicate with a vehicle to unlock a vehicle door and/or to activate an engine.

More recently, some vehicles include a fob-less entry and ignition system that utilizes passcodes to enable a user to unlock a vehicle door and to activate an engine of the vehicle without a key (e.g., a mechanical key, a key fob, a phone-as-a-key) that is carried by the user. In some instances in which a fob-less entry and ignition system is utilized, the engine of the vehicle may potentially remain activated after the user exits the vehicle. In such instances, because the fob-less entry and ignition system does not utilize a key, the fob-less entry and ignition system is unable to turn off the vehicle based upon removal of a key from the vehicle.

Example apparatus and methods disclosed herein include an FEI system that monitors occupant(s) of a vehicle, detects whether one or more of the occupant(s) has exited the vehicle, and subsequently presents a warning if a vehicle initiation passcode has not been reentered and an override button has not been pressed upon occupant(s) exiting the vehicle to warn those prior occupant(s) that the vehicle remains activated.

As used herein, a "fob-less entry and ignition system" and an "FEI system" refer to a vehicle system that enables a user to unlock and/or open door(s) of a vehicle to enter a vehicle cabin and enables the user to activate an engine of the vehicle without a key (e.g., a mechanical key, a key fob, a phone-as-a-key, and/or other device to be carried by the user). Example FEI systems unlock and/or open door(s) and activate an engine of a vehicle upon a user entering corresponding passcodes (e.g., vehicle entry passcodes, vehicle initiation passcodes) via input device(s) of the vehicle. As used herein, a "mechanical key" refers to a key that is inserted into a keyhole and rotated to open a door and/or to activate components of a vehicle. As used herein, a "key fob" refers to an electronic device that wirelessly communicates with a vehicle to unlock door(s), open door(s) and/or activate an engine of a vehicle. As used herein, a "phone-as-a-key" refers to a mobile device (e.g., a smart phone, a wearable, a smart watch, a tablet, etc.) that includes hardware and/or software to function as a key fob.

The system of the examples disclosed herein includes occupancy sensing modules to monitor occupancy locations within the vehicle cabin. Each of the occupancy sensing modules includes sensor(s) to detect when an occupant of the vehicle has exited the vehicle cabin from that occupancy location. In some examines, an occupancy sensing module includes a seatbelt switch and a door-ajar sensor and determines that an occupant has exited the vehicle when the seatbelt latch is unbuckled and an adjacent door corresponding to the door-ajar sensor has remained open for a period of time associated with an occupant exiting the vehicle.

A warning controller of the system of the examples disclosed herein initiates a timer upon determining that an occupant has exited the vehicle and emits an alarm (e.g., via a horn and/or lighting) if the timer reaches a threshold. Before the timer has reached the threshold, the occupant who exited the vehicle cabin and/or another occupant who has remained in the vehicle cabin may enter a reentry of the passcode, enter another passcode that corresponds to deactivation of alarm, and/or press an override button to prevent the warning controller from emitting the alarm. That is, an occupant may reenter the passcode, enter the other passcode that corresponds to deactivation of the alert, and/or press the override button to prevent the alert from being emitted when the ignition is intended to remain activated. For example, the system enables the passcode to be reentered and/or the override button to be pressed to prevent the alert from being emitted when a passenger who does not have a passcode to access the vehicle cabin and/or to initiate the ignition has exited the vehicle cabin.

Turning to the figures, FIG. 1 is a side view of an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes a door 102, a keypad 104, and a window 106. Further, the vehicle includes fob-less entry and ignition (FEI) system that enables a user (e.g., an occupant 302 of FIG. 3, an occupant 304 of FIG. 3) to unlock a door 102 and/or to start an ignition of an engine (e.g., an engine 210 of FIG. 2) without utilizing a mechanical key, a key fob, and/or a phone-as-a-key. In the illustrated example, the FEI system includes the keypad 104 that is located on an exterior surface of the door 102.

The keypad 104 is located outside of a cabin (e.g., a cabin 202 of FIG. 2) and enables the user of the vehicle 100 to unlock the door 102 and/or enter the cabin of the vehicle 100 without utilizing a mechanical key, a key fob, and/or a phone-as-a-key. In the illustrated example, the keypad 104 includes buttons for receiving a passcode from the user to unlock and/or open doors (e.g., the door 102) of the vehicle 100. For example, the buttons of the keypad 104 are labeled with characters (e.g., numeric characters, alphabetic characters, alphanumeric characters) to enable the user to identify each of the buttons. In some examples, a first button of the keypad 104 may be labeled "1-2," a second button may be labeled "3-4," a third button may be labeled "5-6," a fourth button may be labeled "7-8," and a fifth button 310 may be labeled "9-0" to enable the user to enter a numeric passcode.

While FIG. 1 depicts the keypad 104 on the door 102 of the vehicle, the keypad 104 may be positioned at any other location along an exterior surface of the vehicle 100 (e.g., another door, on a hood, along a pillar, on a windshield, etc.). Alternatively, the keypad 104 may be a virtual keypad that is projected onto the window 106 of the vehicle 100. Further, in some examples, the vehicle 100 may include a plurality of keypads that are located and/or presented at different positions along the exterior surface of the vehicle 100. For example, the keypad 104 may be located on the door 102 on the passenger-side of the vehicle 100, and another keypad may be located on a driver-side door of the vehicle 100.

Figure 2:
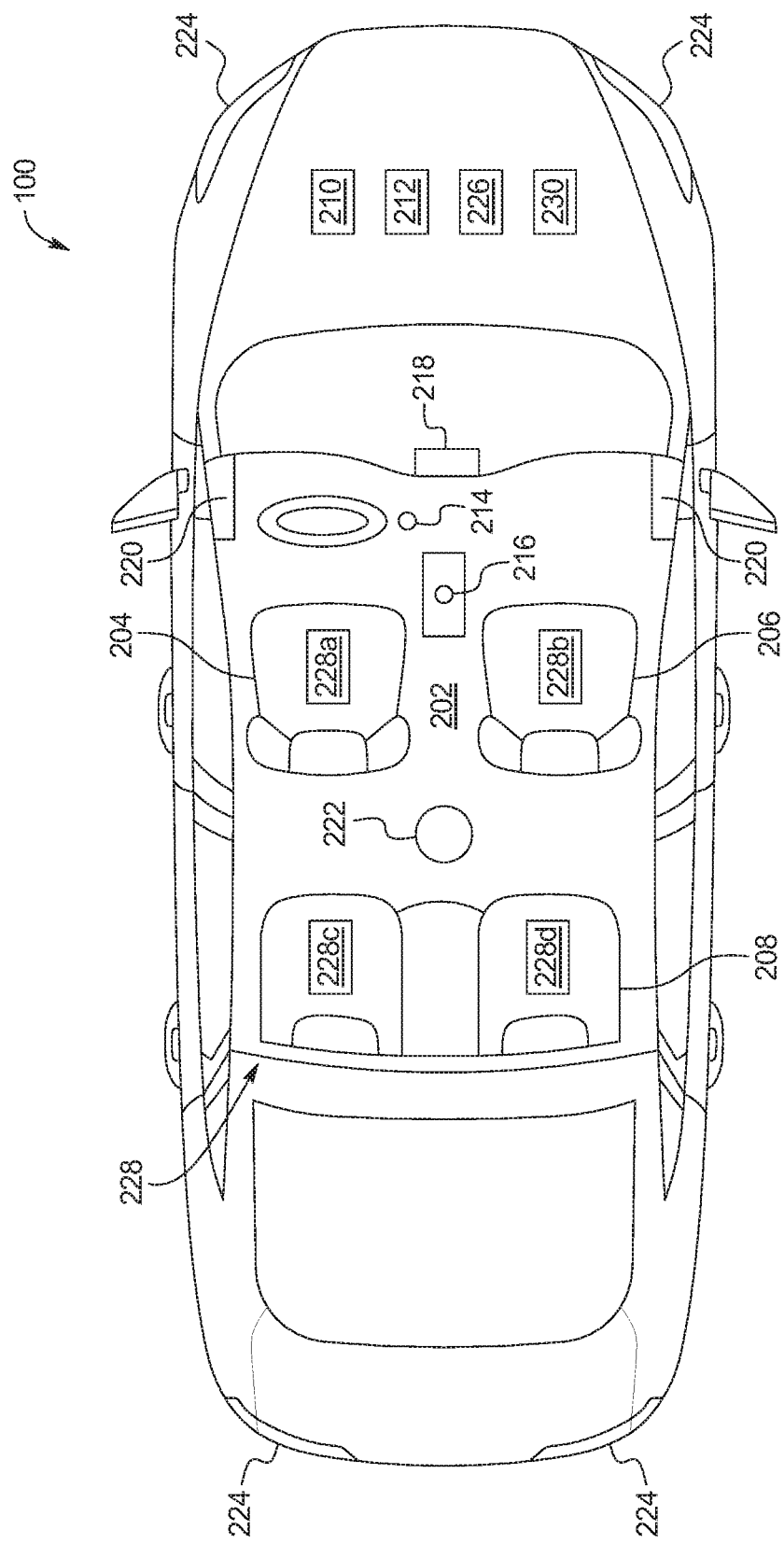
FIG. 2 depicts a top view of the vehicle of FIG. 1.

FIG. 2 depicts a top view of the vehicle 100. As illustrated in FIG. 2, the vehicle 100 includes a cabin 202 in which a front seat 204 (e.g., a first front seat, an operator seat, a driver seat), a front seat 206 (e.g., a second front seat, a passenger seat), and a rear seat 208 of the vehicle 100 are located.

As illustrated in FIG. 2, the vehicle 100 also includes an engine 210, a transmission 212, an ignition switch 214, and a gear stick 216. The engine 210 includes an internal combustion engine, an electric motor, and/or any other power source that propels movement of the vehicle 100. The ignition switch 214 is utilized by a user of the vehicle 100 to operate the engine 210, a battery, and/or electronic accessories of the vehicle 100. For example, the ignition switch 108 includes an on-position at which the engine 210 is activated, an off-position at which the engine is 210 inactive, a start position to activate the engine 210, and/or an accessory position at which the electronic accessories are activated. Further, the transmission 212 is a mechanism that includes a gearbox to transmit power from the engine 210 to wheels of the vehicle 100. The gear stick 110 is utilized by a user of the vehicle 100 to shift between gears (e.g., neutral, reverse, first gear, second gear, etc.) and/or modes (e.g., park, reverse, neutral, drive) of the transmission 212.

Further, the vehicle 100 of the illustrated example includes a touchscreen 218 and speakers 220 located within the cabin 202. The touchscreen 218 of the vehicle 100 provides an interface between the vehicle 100 and occupant(s) (e.g., an occupant 302 of FIG. 3, an occupant 304 of FIG. 3) of the vehicle 100. For example, the touchscreen 218 is a resistive touchscreen, a capacitive touchscreen, and/or any other type of touchscreen that enables an occupant of the vehicle 100 to enter a passcode (e.g., a numeric and/or alphabetic code, a pattern, etc.) and/or biometrics to activate or turn on the engine 210 of the vehicle 100 and/or to press an override button (e.g., a digital button) to deactivate a timer. Additionally or alternatively, the vehicle 100 includes other input device(s) (e.g., a control knob, an instrument panel, an audio input device such as a cabin microphone, buttons, etc.) that enable the occupant to enter the passcode that activates the engine 210 and/or to override the timer. Further, the speakers 220 are located within the cabin 202 and emit audio signals to occupant(s) for informative, instructive, and/or entertainment purposes.

As illustrated in FIG. 2, the vehicle 100 includes interior lights 222, exterior lights 224, and a horn 226. The interior lights 222 include one or more lights (e.g., dome lights, floor lights, dash lights, etc.) that emit light within the cabin 202 of the vehicle 100. The exterior lights 224 includes one or more lights (e.g., headlights, taillights, etc.) of the vehicle 100 that emit light from an exterior of the vehicle 100. The horn 226 is a sound-making device that emits audio signal(s) directed to a surrounding area of the vehicle 100. Oftentimes, an operator (e.g., a driver) utilizes a horn to indicate that the vehicle 100 is approaching and/or to call attention to a hazard. Additionally or alternatively, the vehicle 100 includes other sound-making device(s) that emit audio signal(s) directed to the surrounding area of the vehicle 100.

The vehicle 100 of the illustrated example also includes one or more occupancy sensor modules 228. For example, the vehicle 100 includes an occupancy sensor module 228a (e.g., a first occupancy seat module) that detects when an occupant (e.g., an occupant 302 of FIG. 3) is positioned at the front seat 204 (e.g., an operator seat, a driver seat), an occupancy sensor module 228b (e.g., a second occupancy seat module) that detects when an occupant (e.g., an occupant 304 of FIG. 3) is positioned at the front seat 206 (e.g., a passenger seat), an occupancy sensor module 228c (e.g., a third occupancy seat module) that detects when an occupant is positioned at a driver-side location of the rear seat 208 (e.g., a passenger seat), and an occupancy sensor module 228d (e.g., a fourth occupancy seat module) that detects when an occupant is positioned at a passenger-side location of the rear seat 208 (e.g., a passenger seat). In other examples, the cabin 202 may include more or less of the occupancy sensor modules 228 to monitor more or less seats of the vehicle 100. In some examples, the vehicle 100 includes only includes one of the occupancy sensor modules 228 for the front seat 204 (e.g., the driver seat, the operator seat) and/or the front seat 206 (e.g., the front passenger seat).

Further, the vehicle 100 includes a warning controller 230 that causes a warning or alert to be emitted when an occupant exits the cabin 202 of the vehicle 100 without receiving an input from the operator via the ignition switch 214 to deactivate or turn off the engine 210 of the vehicle 100.

In operation, occupant(s) of the vehicle 100 enter the cabin 202 upon an occupant entering a vehicle entry passcode via the keypad 104 that is accessible from the exterior of the vehicle 100. Upon entering the vehicle entry passcode, an occupant (e.g., a driver and/or operator, a passenger) enters a vehicle initiation passcode via the touchscreen 218 to activate the engine 210 of the vehicle 100. An occupant may subsequently actuate the ignition switch 214 to deactivate the engine 210 of the vehicle 100.

Further, when the engine 210 is activated, the occupancy sensor modules 228 detect whether the front seat 204, the front seat 206, and/or the rear seat 208 are occupied by an occupant. The warning controller 230 also monitors the ignition switch 214 and the transmission 212. For example, upon identifying that the ignition switch 214 remains in the on-position and the transmission 212 remains in park or neutral, the warning controller 230 monitors the occupancy sensor modules 228 and corresponding doors adjacent to the occupancy sensor modules 228 to determine whether an occupant has exited the cabin 202 of the vehicle 100. For example, the warning controller 230 determines that an occupant (e.g., a driver and/or operator) has exited the cabin 202 from the front seat 204 in response to the occupancy sensor module 228a (e.g., via a seatbelt sensor 402 of FIG. 4) detecting that the previously present occupant is no longer at the front seat 204 and the warning controller 230 determining that the door adjacent to the occupancy sensor module 228a is open for a predetermined period of time corresponding to an occupant exiting the cabin 202.

Upon detecting that the occupant has exited the cabin 202 while the engine 210 remains activated, the warning controller 230 initiates a timer. If the timer reaches a predetermined threshold, the warning controller 230 emits an alert to warn the occupant(s) that the engine 210 remains activated. In some examples, the warning controller 230 emits an audio alert via the horn 226 and/or other external audio source of the vehicle 100. Additionally or alternatively, the warning controller 230 emits a visual alert via the internal lighting 222 and/or the external lighting 224 of the vehicle 100.

Further, the warning controller 230 enables an occupant to preemptively stop the alert from being emitted. That is, the warning controller 230 deactivates the timer to prevent the alert from being emitted responsive to an occupant entering a reentry the vehicle initiation passcode via the touchscreen 218, entering another passcode via the touchscreen 218 that corresponds to deactivation of the timer, and/or providing an input via an override button (e.g., a mechanical button, a digital button presented via the touchscreen 218) while the timer is counting to its predetermined threshold. For example, if an occupant (e.g., a driver and/or operator) exits the cabin 202 from the front seat 204 while the engine 210 remains activated, that occupant may return to the cabin to enter a reentry of the vehicle initiation passcode via the touchscreen 218, to enter an entry of another passcode that corresponds to deactivation of the timer via the touchscreen 218, and/or to press the override button. Additionally or alternatively, another occupant (e.g., a passenger) that has remained within the cabin 202 may prevent the alert from being emitted by pressing the override button, reentering the vehicle initiation passcode, and/or entering another passcode that corresponds to deactivation of the timer if the occupant that has remained within the cabin 202 has knowledge of the vehicle initiation passcode.

Figure 3:
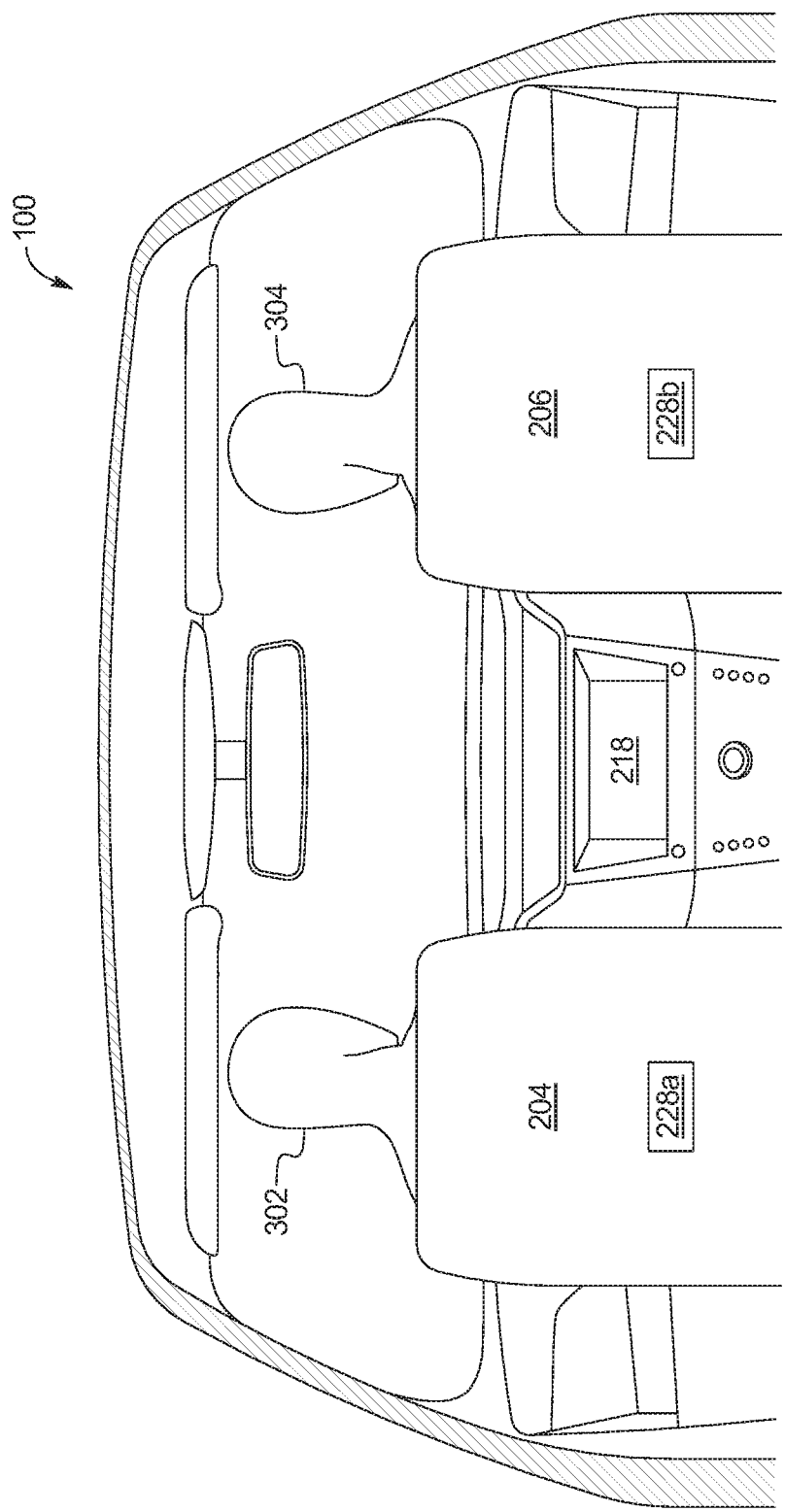
FIG. 3 depicts a cabin of the vehicle of FIG. 1.

FIG. 3 depicts a portion of the cabin 202 of the vehicle 100 when an occupant 302 and another occupant 304 are located within the cabin 202. The occupant 302 (e.g., a driver and/or operator of the vehicle 100) is seated at the front seat 204 within the cabin 202, and the occupant (e.g., a passenger of the vehicle 100) is seated at the front seat 206 within the cabin 202. Further, the occupancy sensor module 228a detects the presence of the occupant 302 at the front seat 204, and the occupancy sensor module 228b detects the presence of the occupant 304 at the front seat 206.

In the illustrated example, the occupant 302 or the occupant 304 enters the passcode (e.g., a first passcode) to start the engine 210 via the FEI system. The engine 210 deactivates via the FEI system in response to the occupant 302 or the occupant 304 actuating the ignition switch 214 (e.g., to an off-position). Otherwise, if the occupancy sensor module 228a and/or the occupancy sensor module 228b detects that the occupant 302 and/or the occupant 304, respectively, has exited the cabin 202 while the engine remains activated, the warning controller 230 initiates a timer for emitting an alert. For example, the warning controller 230 monitors whether the occupant 302 and/or the occupant 304 has exited the cabin 202 upon identifying that the ignition switch 214 is activated (e.g., in the on-position) and the transmission 212 is in park or neutral.

If the occupant 302 (e.g., the driver and/or operator of the vehicle 100) has exited the vehicle 100 and has knowledge of the passcode, the occupant 302 may return to the vehicle 100 while the timer is counting to reenter the passcode (e.g., the first passcode) via the touchscreen 218, enter another passcode that corresponds to deactivation of the timer via the touchscreen 218, and/or actuate the override button to cause the warning controller 230 to deactivate the timer. If the occupant 302 has exited the vehicle 100, the occupant 304 may press the override button, reenter the passcode via the touchscreen 218 (if the occupant 304 has knowledge of the passcode), and/or enter another passcode that corresponds to deactivation of the timer to cause the warning controller 230 to deactivate the timer. Similarly, if the occupant 304 has exited the vehicle 100 and has knowledge of the passcode, the occupant 304 may return to the vehicle 100 while the timer is counting to press the override button, reenter the passcode via the touchscreen 218, and/or enter another passcode that corresponds to deactivation of the timer to cause the warning controller 230 to deactivate the timer. If the occupant 304 has exited the vehicle 100, the occupant 302 may press the override button, reenter the passcode via the touchscreen 218 (if the occupant 302 has knowledge of the passcode), and/or another enter passcode that corresponds to deactivation of the timer to cause the warning controller 230 to deactivate the timer. Otherwise, if the timer reaches a predetermined threshold, the warning controller 230 emits the alert to warn the occupant 302 and/or the occupant 304 that the engine 210 is still active.

Figure 4:
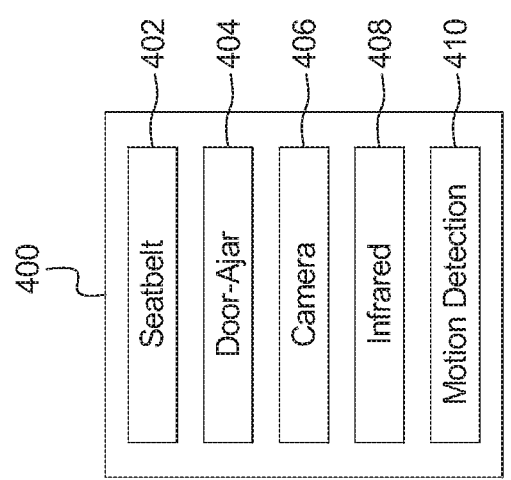
FIG. 4 is a block diagram of an occupancy sensing module of the vehicle of FIG. 1.

FIG. 4 is a block diagram of an example occupancy sensing module 400 that includes sensors for monitoring a presence of an occupant (e.g., the occupant 302, the occupant 304) at a location within the cabin 202 of the vehicle 100 (e.g., the front seat 204, the front seat 206, the driver-side location of the rear seat 208, the passenger-side location of the rear seat 208). For example, the occupancy sensing module 400 is representative of one or more of the occupancy sensor modules 228 (e.g., the occupancy sensor module 228a, the occupancy sensor module 228b, the occupancy sensor module 228c, the occupancy sensor module 228d of FIG. 2) of the vehicle 100. In other examples, the occupancy sensing module 400 and/or one or more of the occupancy sensor modules 228 may include a different set of sensor(s) for monitoring a presence of an occupant at a vehicle location.

In the illustrated example, the occupancy sensing module 400 includes a seatbelt sensor 402, a door-ajar sensor 404, a camera 406, an infrared sensor 408, and a motion detection sensor 410. For example, the seatbelt sensor 402 (e.g., a Hall-effect sensor) detects whether a seatbelt at the vehicle position corresponding to the occupancy sensing module 400 is buckled or unbuckled. The door-ajar sensor 404 detects whether a door (e.g., the door 102) adjacent to the vehicle position corresponding to the occupancy sensing module 400 is an open position or a closed position. The camera 406 collects image(s) and/or video of the vehicle position corresponding to the occupancy sensing module 400 to enable identification (e.g., via the warning controller 230) of whether an occupant is present or not present at that vehicle position. The infrared sensor 408 monitors infrared radiation at the vehicle position corresponding to the occupancy sensing module 400 to enable identification (e.g., via the warning controller 230) of whether an occupant is present or not present at that vehicle position. Further, the motion detection sensor 410 (e.g., a microwave sensor, an ultrasonic sensor, etc.) detects whether there is movement at the vehicle position corresponding to the occupancy sensing module 400 to enable identification (e.g., via the warning controller 230) of whether an occupant is present or not present at that vehicle position.

The occupancy sensing module 400 of the illustrated example is configured to detect that an occupant is present at the corresponding vehicle position responsive to the seatbelt sensor 402 detecting that the corresponding seatbelt is buckled, the image(s) and/or video captured by the camera 406 indicating that the occupant is present at the vehicle location, the infrared sensor 408 detecting the presence of the occupant at the vehicle location, the motion detection sensor 410 detecting motion at the vehicle location, and/or any combination thereof. The occupancy sensing module 400 of the illustrated example is also configured to subsequently detect that the occupant has left the corresponding vehicle position responsive to the seatbelt sensor 402 detecting that the corresponding seatbelt is unbuckled, the door-ajar sensor 404 detecting that the door has been open for at least a predetermined period of time corresponding with an occupant exiting the vehicle 100, the image(s) and/or video captured by the camera 406 indicating that the occupant is not present at the vehicle location, the infrared sensor 408 not detecting the presence of the occupant at the vehicle location, the motion detection sensor 410 not detecting motion at the vehicle location, and/or any combination thereof.

Figure 5:
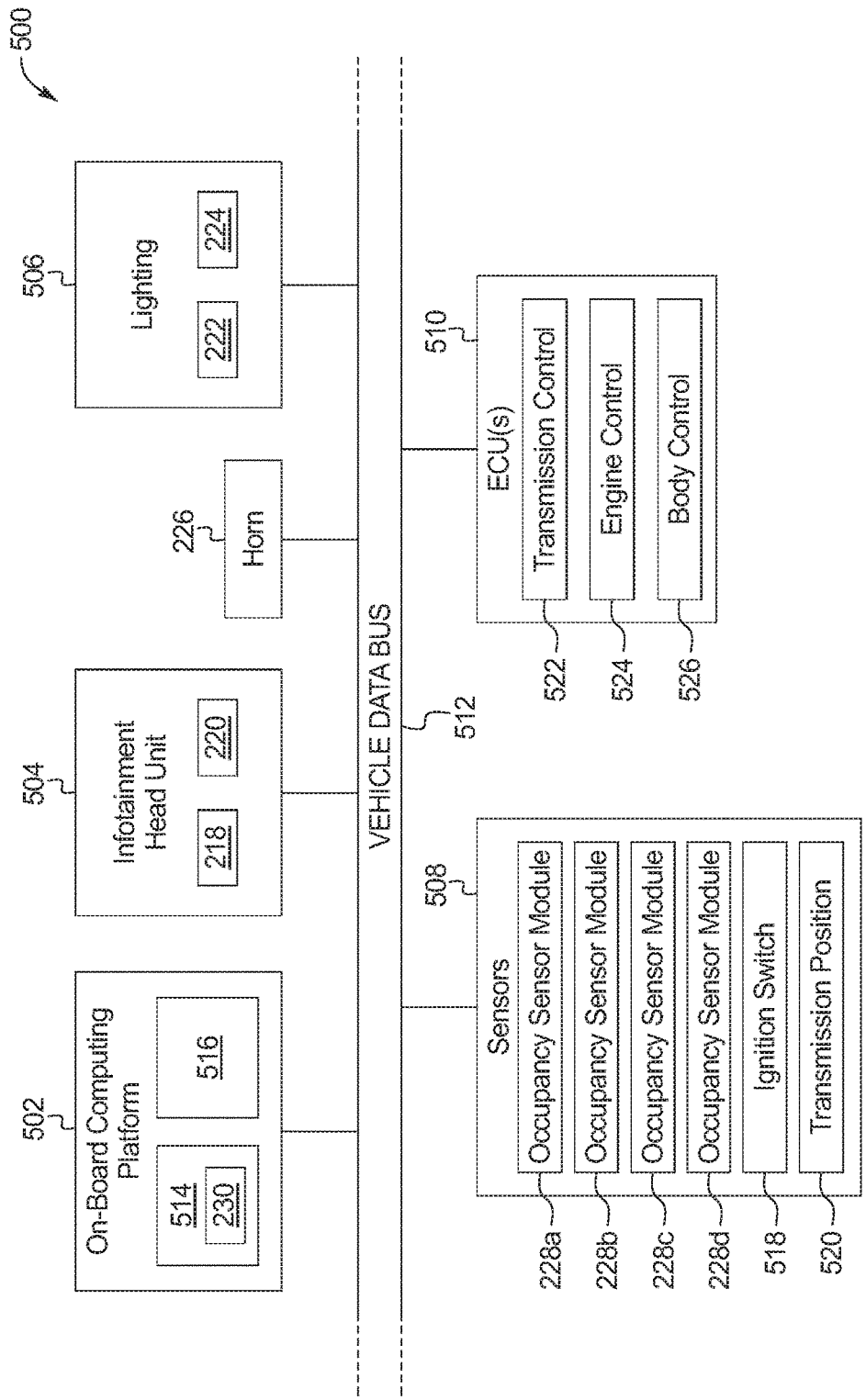
FIG. 5 is a block diagram of electronic components of the vehicle of FIG. 1.

FIG. 5 is a block diagram of electronic components 500 of the vehicle 100. In the illustrated example, the electronic components 500 include an on-board computing platform 502, an infotainment head unit 504, the horn 226, lighting 506, sensors 508, electronic control units (ECUs) 510, and a vehicle data bus 512.

The on-board computing platform 502 includes a microcontroller unit, controller or processor 514 and memory 516. In some examples, the processor 514 of the on-board computing platform 502 is structured to include the warning controller 230. Alternatively, in some examples, the warning controller 230 is incorporated into another electronic control unit (ECU) with its own processor 514 and memory 516. The processor 514 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 516 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 516 includes multiple kinds of memory, particularly volatile memory and non-volatile memory.

The memory 516 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 516, the computer readable medium, and/or within the processor 514 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 504 provides an interface between the vehicle 100 and a user. The infotainment head unit 504 includes digital and/or analog interfaces (e.g., input devices and output devices) to receive input from and display information for the user(s). The input devices include, for example, the override button, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, the touchscreen 218 and/or other display (e.g., a heads-up display, a center console display such as a liquid crystal display (LCD), an organic light emitting diode (OLED) display, a flat panel display, a solid state display, etc.), and/or the speakers 220. In the illustrated example, the infotainment head unit 504 includes hardware (e.g., a processor or controller, memory, storage, etc.) and software (e.g., an operating system, etc.) for an infotainment system (such as SYNC® and MyFord Touch® by Ford®, etc.). Additionally, the infotainment head unit 504 displays the infotainment system on, for example, the touchscreen 218.

The lighting 506 of the vehicle 100 in the illustrated example includes the internal lighting 222 (e.g., a dome lamp) positioned within the cabin 202 and the external lighting 224 (e.g., headlights, taillights, etc.). For example, the lighting 506 is activated to emit an alert indicating that an occupant (e.g., the occupant 302, the occupant 304) has exited the cabin 202 of the vehicle 100.

The sensors 508 are arranged in and around the vehicle 100 to monitor properties of the vehicle 100 and/or an environment in which the vehicle 100 is located. One or more of the sensors 508 may be mounted to measure properties around an exterior of the vehicle 100. Additionally or alternatively, one or more of the sensors 508 may be mounted inside a cabin of the vehicle 100 or in a body of the vehicle 100 (e.g., an engine compartment, wheel wells, etc.) to measure properties in an interior of the vehicle 100. For example, the sensors 508 include accelerometers, odometers, tachometers, pitch and yaw sensors, wheel speed sensors, microphones, tire pressure sensors, biometric sensors and/or sensors of any other suitable type.

In the illustrated example, the sensors 508 include the occupancy sensor module 228a, the occupancy sensor module 228b, the occupancy sensor module 228c, the occupancy sensor module 228d, an ignition switch sensor 518, and a transmission position sensor 520. For example, each of the occupancy sensor module 228a, the occupancy sensor module 228b, the occupancy sensor module 228c, and the occupancy sensor module 228d include a seatbelt sensor (e.g., the seatbelt sensor 402 of FIG. 4), a door-ajar sensor (e.g., the door-ajar sensor 404 of FIG. 4), a camera (e.g., the camera 406 of FIG. 4), an infrared sensor (e.g., the infrared sensor 408 of FIG. 4), a motion detection sensor (e.g., the motion detection sensor 410 of FIG. 4), and/or any other sensor(s) that are capable of detecting the presence of an occupant in the front seat 204, the front seat 206, and the rear seat 208, respectively. Further, the ignition switch sensor 518 detects the position of the ignition switch 214 (e.g., an on-position, an off-position, a start position, an accessories position), and the transmission position sensor 520 detects the position of the gear stick 110 (e.g., in park, in reverse, in forward, etc.).

The ECUs 510 monitor and control the subsystems of the vehicle 100. For example, the ECUs 510 are discrete sets of electronics that include their own circuit(s) (e.g., integrated circuits, microprocessors, memory, storage, etc.) and firmware, sensors, actuators, and/or mounting hardware. The ECUs 510 communicate and exchange information via a vehicle data bus (e.g., the vehicle data bus 512). Additionally, the ECUs 510 may communicate properties (e.g., status of the ECUs 510, sensor readings, control state, error and diagnostic codes, etc.) to and/or receive requests from each other. For example, the vehicle 100 may have seventy or more of the ECUs 510 that are positioned in various locations around the vehicle 100 and are communicatively coupled by the vehicle data bus 512.

In the illustrated example, the ECUs 510 include a transmission control unit 522, an engine control unit 524, and a body control module 526. The transmission control unit 522 controls operation of the transmission 212 (e.g., an automatic transmission) of the vehicle 100, and the engine control unit 524 controls operation of the engine 210 of the vehicle 100. Further, the body control module 526 controls one or more subsystems throughout the vehicle 100, such as power windows, power locks, an immobilizer system, power mirrors, etc. For example, the body control module 526 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 512 communicatively couples the horn 226, the on-board computing platform 502, the infotainment head unit 504, the lighting 506, the sensors 508, and the ECUs 510. In some examples, the vehicle data bus 512 includes one or more data buses. The vehicle data bus 512 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
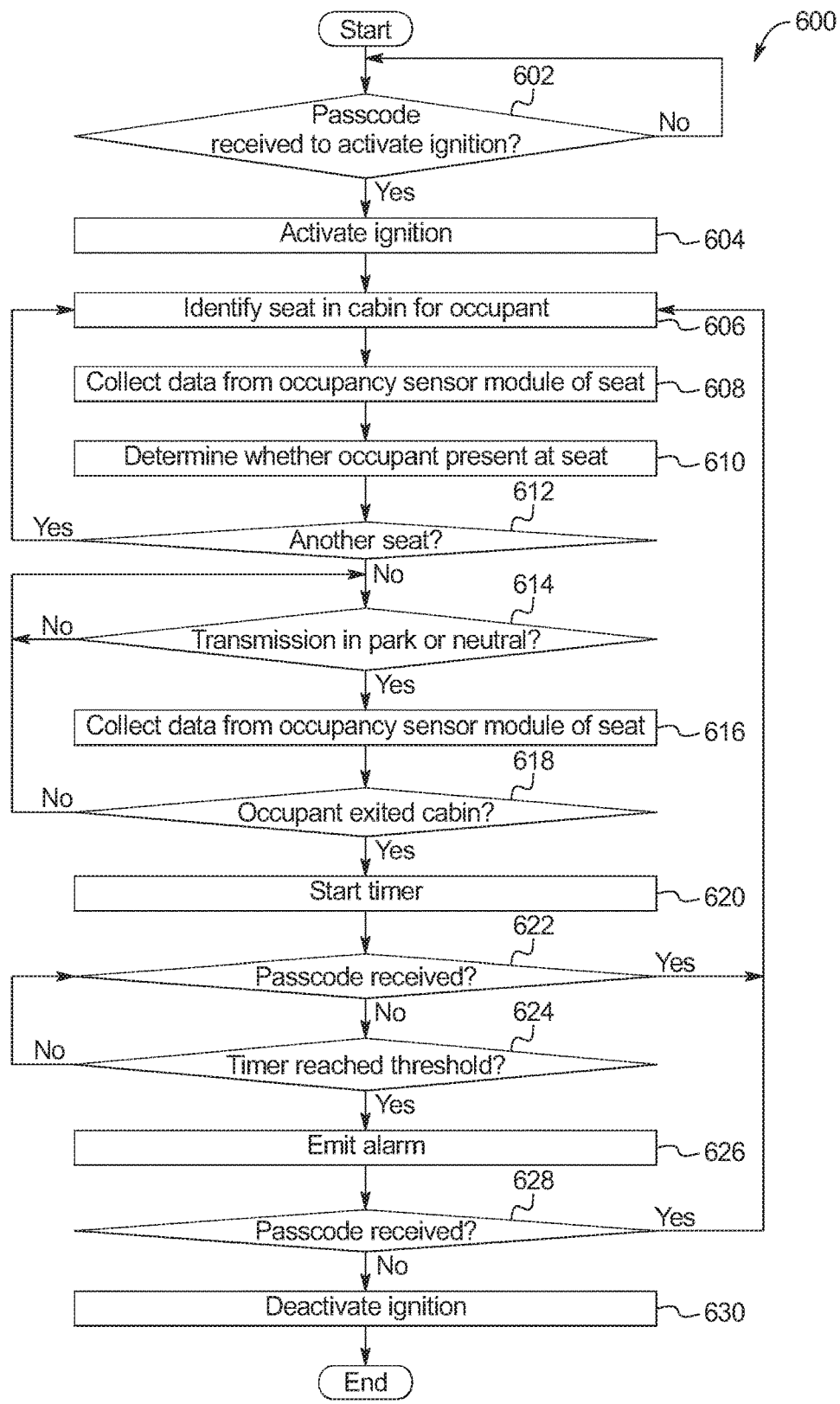
FIG. 6 is a flowchart for monitoring and alerting occupants of the vehicle of FIG. 1 for an ignition system in accordance with the teachings herein.

FIG. 6 is a flowchart of an example method 600 to monitor and alert occupant(s) of a vehicle for an ignition system in accordance with the teachings herein.

FIG. 6 is a flowchart of an example method 600 to monitor and alert occupant(s) of a vehicle for an ignition system in accordance with the teachings herein. The flowchart of FIG. 6 is representative of machine readable instructions that are stored in memory (such as the memory 516 of FIG. 5) and include one or more programs which, when executed by a processor (such as the processor 514 of FIG. 5), cause the vehicle 100 to implement the example warning controller 230 of FIGS. 2 and 5. While the example program is described with reference to the flowchart illustrated in FIG. 6, many other methods of implementing the example warning controller 230 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602, the warning controller 230 determines whether the touchscreen 218 and/or another input device of the vehicle 100 has received a passcode (e.g., a vehicle initiation passcode, a first passcode) to initiate the vehicle 100 by activating the engine 210. In response to the warning controller 230 determining that the touchscreen 218 and/or other input device did not receive the passcode to initiate the vehicle 100, the method 600 returns to block 602. Otherwise, in response to the warning controller 230 determining that the touchscreen 218 and/or other input device received the passcode to initiate the vehicle 100, the method 600 proceeds to block 604.

At block 604, the warning controller 230 activates ignition of the engine 210 to initiate the vehicle 100. At block 606, the warning controller 230 identifies a seat location (e.g., the front seat 204, the front seat 206, the driver-side seat of the rear seat 208, the passenger-side seat of the rear seat 208) within the cabin 202 of the vehicle 100. At block 608, the warning controller 230 collects data from one of the occupancy sensor modules 228 (e.g., the occupancy sensor module 228a, the occupancy sensor module 228b, the occupancy sensor module 228c, the occupancy sensor module 228d) that corresponds to the identified seat location. For example, the data includes data collected by the seatbelt sensor 402, the door-ajar sensor 404, the camera 406, the infrared sensor 408, the motion detection sensor 410, and/or any other sensor of the occupancy sensor module that detects a presence of an occupant. At block 610, the warning controller 230 determines whether this is an occupant (e.g., the occupant 302, the occupant 304) at the identified seat location based upon the data collected from the corresponding occupancy sensor module. At block 612, the warning controller 230 determines whether there is another seat location within the cabin 202 of the vehicle 100 to identify. In response to the warning controller 230 determining that there is another seat location, the method 600 returns to block 606. Otherwise, in response to the warning controller 230 determining that there is not another seat location, the method 600 proceeds to block 614.

At block 614, while the ignition switch 214 of the vehicle 100 remains in the on-position, the warning controller 230 determines whether the transmission 212 of the vehicle 100 is in park or neutral (e.g., via the transmission position sensor 520). In response to the warning controller 230 determining that the transmission 212 is not in park or neutral, the method 600 returns to block 614. Otherwise, in response to the warning controller 230 determining that the transmission 212 is in park or neutral, the method 600 proceeds to block 616. At block 616, the warning controller 230 again collects data from those of the occupancy sensor modules 228 corresponding to seat location(s) that the warning controller 230 identified at block 610 as being occupied by an occupant.

At block 618, the warning controller 230 determines whether one or more of the occupant(s) positioned at the seat location(s) corresponding to the occupancy sensor modules 228 has exited the cabin 202 of the vehicle 100. For example, the warning controller 230 determines that an occupant exited the cabin 202 from a seat position via the corresponding one of the occupancy sensor modules 228. For example, the corresponding one of the occupancy sensor modules 228 detects that the occupant has exited the cabin 202 in response to the seatbelt sensor 402 detecting that the corresponding seatbelt is unbuckled, the door-ajar sensor 404 detecting that the corresponding door has been open for at least a predetermined period of time, the image(s) and/or video captured by the camera 406 indicating that the occupant is not present at the seat location, the infrared sensor 408 not detecting the presence of the occupant at the seat location, the motion detection sensor 410 not detecting motion at the seat location, and/or any combination thereof. In response to the warning controller 230 determining that an occupant has not exited the cabin 202, the method 600 returns to block 614. Otherwise, in response to the warning controller 230 determining that one or more occupant(s) has exited the cabin 202, the method 600 proceeds to block 620.

At block 620, the warning controller 230 starts a timer. At block 622, the warning controller 230 determines whether the touchscreen 218 and/or other input device has received reentry of the passcode, the touchscreen 218 and/or other input device has received entry of another passcode that corresponds to deactivation of the timer, and/or the override button has received an input while the timer is counting. In some examples, the occupant that exited the cabin 202 returns to the cabin to provide an input via the override button, reenter the passcode, and/or enter another passcode that corresponds to deactivation of the timer. In other examples, another occupant that has remained in the cabin 202 provides an input via the override button, reenters the passcode, and/or enters another passcode that corresponds to deactivation of the timer if the other occupant has knowledge of the passcode. In response to the warning controller 230 determining that the passcode and/or other timer-deactivation input has been received, the method 600 returns to block 606. Otherwise, in response to the warning controller 230 determining that the passcode and/or other timer-deactivation input has not been received, the method 600 proceeds to block 624.

At block 624, the warning controller 230 determines whether the timer has reached a predetermined threshold (e.g., a first threshold, a user-configurable threshold). In response to the warning controller 230 determining that the threshold has not been reached, the method 600 returns to block 622. Otherwise, in response to the warning controller 230 determining that the threshold has been reached, the method 600 proceeds to block 626 at which the warning controller 230 emits an alert to warn the previous occupant(s) of the vehicle 100 that the vehicle 100 remains activated. In some examples, the warning controller 230 emits an audio alert via the horn 226 and/or other sound-making device of the vehicle 100. In other examples, the warning controller 230 emits an visual alert via the interior lights 222 and/or the exterior lights 224 of the vehicle 100.

At block 626, the warning controller 230 determines whether the touchscreen 218 and/or other input device of the vehicle 100 has received the passcode and/or another input that corresponds with deactivation of the alert after and/or while the alert is emitted. For example, the warning controller 230 determines whether the passcode has been reentered, another passcode has been entered, and/or the override button has been pressed within another predetermined threshold (e.g., a second threshold, another user-configurable threshold) after the warning controller 230 began emitting the alert. For example, the second predetermined threshold enable an occupant and/or a prior occupant to enter a reentry the passcode, enter another passcode that corresponds with deactivation of the alert, and/or provide an input via the override button after the warning controller 230 has emitted the alert to deactivate the alert and/or to maintain activation of the vehicle 100. In response to the warning controller 230 determining that the passcode and/or other alert-deactivation input has been received, the method 600 returns to block 606. Otherwise, in response to the warning controller 230 determining that the passcode and/or other alert-deactivation input has not been received, the method continues to block 630 at which the warning controller 230 deactivates the engine 210 to prevent the vehicle 100 from running when the occupant(s) are not present.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a cabin;
   a touchscreen within the cabin;
   an engine to activate responsive to the touchscreen receiving a passcode;
   seats within the cabin;
   occupancy sensor modules to detect occupancy of the seats; and
   a warning controller to:
      initiate a timer upon detecting, via the occupancy sensor modules, that an occupant has exited the cabin;
      responsive to the touchscreen receiving a reentry of the passcode while the timer is initiated, deactivate the timer to prevent an alert from being emitted; and
      emit the alert responsive to the timer reaching a predetermined threshold.

2. The vehicle of claim 1, wherein the touchscreen receives the reentry of the passcode from another occupant with knowledge of the passcode when the occupant has exited the cabin.

3. The vehicle of claim 2, wherein the occupant who has exited the cabin is an operator and the other occupant who enters the reentry of the passcode is a passenger.

4. The vehicle of claim 1, wherein the warning controller deactivates the timer to prevent the alert from being emitted responsive to the touchscreen receiving another passcode that corresponds to deactivation of the timer.

5. The vehicle of claim 1, further including a horn and lighting, wherein the alert includes at least one of an audio alert and a visual alert, wherein the warning controller emits at least one of the audio alert via the horn and the visual alert via the lighting.

6. The vehicle of claim 1, wherein the seats include a driver seat and a passenger seat, one of the occupancy sensor modules monitor the driver seat, and another of the occupancy sensor modules monitor the passenger seat.

7. The vehicle of claim 1, wherein one or more of the occupancy sensor modules includes a seatbelt sensor to detect whether the occupant is positioned at a corresponding one of the seats within the cabin.

8. The vehicle of claim 1, wherein one or more of the occupancy sensor modules includes a door-ajar sensor that monitors a door adjacent to a corresponding one of the seats to detect whether the occupant is positioned within the cabin.

9. The vehicle of claim 8, wherein the warning controller detects that the occupant has exited the cabin from the corresponding one of the seats responsive to determining that:
   the occupant was positioned at the corresponding one of the seats; and
   the door adjacent to the corresponding one of the seats is subsequently open for a predetermined period of time.

10. The vehicle of claim 1, wherein one of the occupancy sensor modules includes at least one of a motion detection sensor, an infrared sensor, and a camera to detect whether the occupant is positioned at a corresponding one of the seats within the cabin.

11. The vehicle of claim 1, further including a keypad outside of the cabin, the keypad to receive another passcode for at least one of unlocking and opening a vehicle door.

12. A vehicle comprising:
   a cabin;
   a touchscreen;
   an override button
   an engine to activate upon the touchscreen receiving a passcode;
   seats;
   occupancy sensors to detect seat occupancy; and
   a controller to:
      initiate a timer upon detecting, via the occupancy sensors, that an occupant has exited the cabin;
      deactivate the timer upon the override button being pressed to prevent an alert from being emitted; and
      emit the alert upon the timer reaching a predetermined threshold.

13. The vehicle of claim 12, wherein, responsive to the touchscreen receiving a reentry of the passcode while the timer is initiated, the warning controller deactivates the timer to prevent the alert from being emitted.

14. A vehicle comprising:
   a cabin;
   a touchscreen within the cabin;
   an engine to activate responsive to the touchscreen receiving a passcode;
   seats within the cabin;
   occupancy sensor modules to detect occupancy of the seats;
   an ignition switch;
   an ignition switch sensor to monitor the ignition switch;
   a transmission;
   a transmission position sensor to monitor a position of the transmission; and
   a warning controller to:
      detect whether an occupant has exited the cabin responsive to the ignition switch being activated and the transmission being in park or neutral;
      initiate a timer upon detecting, via the occupancy sensor modules, that an occupant has exited the cabin; and
      emit an alert responsive to the timer reaching a predetermined threshold.

15. A method comprising:
   receiving a passcode via an input device in a cabin of a vehicle;
   activating, via a processor, an engine responsive to the input device receiving the passcode;
   detecting occupancy of seats within the cabin via occupancy sensor modules;

initiating, via the processor, a timer upon detecting, via the occupancy sensor modules, that an occupant has exited the cabin;

deactivating the timer to prevent an alert from being emitted responsive to receiving an input via an override button while the timer is initiated; and emitting the alert responsive to the timer reaching a predetermined threshold.

16. A method comprising:

receiving a passcode via an input device in a cabin of a vehicle;

activating, via a processor, an engine responsive to the input device receiving the passcode;

detecting occupancy of seats within the cabin via occupancy sensor modules;

initiating, via the processor, a timer upon detecting, via the occupancy sensor modules, that an occupant has exited the cabin;

deactivating the timer to prevent an alert from being emitted responsive to the input device receiving a reentry of the passcode while the timer is initiated; and emitting the alert responsive to the timer reaching a predetermined threshold.

17. The method of claim 16, further including receiving the reentry of the passcode from a passenger upon a driver exiting the cabin of the vehicle.

18. The method of claim 16, further including deactivating the timer to prevent the alert from being emitted responsive to receiving an input via an override button while the timer is initiated.

19. A method comprising:

receiving a passcode via an input device in a cabin of a vehicle;

activating, via a processor, an engine responsive to the input device receiving the passcode;

detecting occupancy of seats within the cabin via occupancy sensor modules;

detecting whether an occupant has exited the cabin responsive to:

detecting, via an ignition switch sensor, that an ignition switch is activated; and detecting, via a transmission position sensor, that a transmission is in park or neutral;

initiating, via the processor, a timer upon detecting, via the occupancy sensor modules, that the occupant has exited the cabin; and emitting an alert responsive to the timer reaching a predetermined threshold.

20. The method of claim 19, wherein detecting that the occupant has exited the cabin includes:

determining that the occupant was positioned at one of the seats; and detecting, via a door-ajar sensor of a corresponding one of the occupancy sensor modules, that a door adjacent to the one of the seats is subsequently open for a predetermined period of time.

* * * * *